United States Patent [19]

Osawa

[11] Patent Number: 6,072,249

[45] Date of Patent: Jun. 6, 2000

[54] POWER SOURCE DEVICE

[75] Inventor: Katsumi Osawa, Kanagawa, Japan

[73] Assignee: Sony Corporation, Japan

[21] Appl. No.: 08/911,274

[22] Filed: Aug. 14, 1997

[30] Foreign Application Priority Data

Aug. 15, 1996 [JP] Japan .................................. 8-215783

[51] Int. Cl.[7] ...................................................... H02J 3/06
[52] U.S. Cl. .............................. 307/72; 307/64; 307/70; 307/75; 307/85; 324/525
[58] Field of Search ................................. 307/72, 64, 66, 307/70, 75, 80, 85, 86; 315/209 R, 291; 324/525

[56] References Cited

U.S. PATENT DOCUMENTS

| | | | |
|---|---|---|---|
| 4,099,692 | 7/1978 | Kolkman | 307/64 |
| 4,246,633 | 1/1981 | Borkovitz | 307/66 |
| 4,286,194 | 8/1981 | Sherman | 315/209 R |
| 4,583,004 | 4/1986 | Yearsin | 307/64 |

*Primary Examiner*—Albert W. Paladini
*Attorney, Agent, or Firm*—Rader, Fishman & Grauer; Ronald P. Kananen

[57] ABSTRACT

A power source device in which, even in case of mistaken connection of a source power supplying cable, the supply of source power can be halted before destruction of an electronic equipment or of the power source device itself at the time of supplying the source power. A micro-computer 8 is started when fed with the source power from a power source circuit 1, and controls a constant current circuit 2 for not impressing a load voltage across a resistor R1. A camera device 30 is fed with a dc current for load resistance detection via a resistor R2 and a diode D1. A comparator 3 sends to a port P1 of the micro-computer 8 a level signal specifying whether or not the resistance RL is higher than a pre-set value. The micro-computer 8 controls the constant current circuit 2 for supplying the source power to the camera device 30 if the level signal supplied to the port 1 is '1', that is if the load resistance RL is higher than a pre-set value. The micro-computer 8 then controls the constant current circuit 2 for stopping the supply of the source power if abnormal current flows in the camera device 30.

12 Claims, 5 Drawing Sheets

| | COMPARATOR 5 | COMPARATOR 6 | OR GATE 7 |
|---|---|---|---|
| $V_R >$ Ref2 | 1 | 0 | 1 |
| Ref3 $< V_R <$ Ref2 | 0 | 0 | 0 |
| $V_R <$ Ref3 | 0 | 1 | 1 |

POWER SOURCE DEVICE

BACKGROUND OF THE INVENTION

1. Field of the Invention

This invention relates to a power source device used with advantage for a camera control unit designed to supply power to a camera device. More particularly, it relates to a power source device designed to prevent destruction or self-destruction of electronic equipment on mistaken wiring or connection of a cable designed for supplying the power to the electronic equipment.

2. Description of the Related Art

There has been known an imaging system having a camera device for generating image signals of an object and a camera control unit (CCU) for processing the image signals with white balance processing or gamma correction. In this imaging system, the CCU performing the above signal processing also supplies power from an internal power source device to the camera device for reducing its weight and relieving the user of the load during imaging.

Referring to FIG. 1, a CCU 101 having the power source device furnishes power over a coaxial cable 102 to the camera device 103. The CCU 101 processes image signals supplied from the camera device 103 over the coaxial cable 102 and encodes the video signal to send the encoded image signals to a monitor device, not shown.

For preventing possible damage to incorrectly wired electronic equipments on power up after mistaken wiring or connection of the coaxial cable 102 thereto, the CCU 101 detects the current flowing in the camera device or incorrectly connected electronic equipments in order to terminate current supply if the current is abnormal current.

Therefore, possible presence of the mistaken wiring of the coaxial cable 102 cannot be detected unless the power source device in the camera device is turned on.

Moreover, on power up, the current flowing in the camera device 103 is transiently increased due to inrush current, as shown in FIG. 2. Thus, for detecting possible presence of the mistaken wiring, it is necessary to detect the current value in the steady-state of the current after lapse of approximately one second since the time of power up. However, if the current value is measured after the current s in its steady state, the risk is high that the resistor of the electronic equipment be burned out before the current assumes a steady state, or the CCU 101 be self-destroyed.

On the other hand, if the coaxial cable 102 is connected by mistake to an input terminal of a monitor device 104 terminated with 75 ohms such that the current to be supplied to the camera device 103 is supplied by the CCU 101 to the monitor device 104, a dc voltage of 25 V is supplied to the 75-ohm terminal resistor. Thus, the current of 25V/75 ohm= 333 mA flows through this 75 ohm resistor.

The CCU 101 is designed so that, on detection of the 333 mA current, current supply to the monitor device 104 is halted if the threshold current of halting the power source is 200 mA. However, if approximately one second is allowed to lapse since power up until stabilization of the current value, a voltage of 25 V is impressed across the terminal resistor of the monitor device 104. At this time, the power consumption in the terminal resistor becomes 89.3 W thus burning out the terminal resistor without fail.

The CCU 101 is provided with a power source limiter or a fuse for preventing destruction of the power source itself. However, if the coaxial cable 102 between the camera device 103 and the CCU 101 is shorted, the power loss in the CCU 101 is significant, even if a power source limiter is use, such that thermal destruction of the power source cannot be prevented easily. For example, if the limiter becomes effective for the current of 300 mV for the dc voltage of 25V, the power loss of at least 7.5 W or higher is incurred.

SUMMARY OF THE INVENTION

It is therefore an object of the present invention to provide a power source device in which the power supply to an electronic equipment can be halted before destruction or self-destruction of the electronic equipment even in case of mistaken connection of a power supplying cable.

According to the present invention, there is provided a power source device for supplying a source current to an electronic equipment including impedance detection means for detecting, by impressing a small voltage across the electronic equipment, whether or not the impedance of the electronic equipment is not less than a pre-set value, source current supplying means for supplying a second source voltage to the electronic equipment via the power source line and control means for controlling the source current supplying means for supplying the second source voltage to the electronic equipment if the impedance detected by the impedance detection means is not less than the pre-set value.

The power source device impresses the small voltage for checking that the impedance is not less than a pre-set value, before impressing the second voltage across the electronic equipment, so that the second source voltage can be supplied after checking that the electronic equipment with a low impedance, for example, is not connected by mistake.

With the power source device of the present invention, the source current is supplied to the electronic equipment if the load resistance of the electronic equipment is not less than a pre-set value, while the source current is not supplied to the electronic equipment if the current flowing in the electronic equipment is abnormal, so that it becomes possible to prevent the load resistance of the mistakenly connected electronic equipment from being damaged by overvoltage, while it also becomes possible to evade self-destruction caused by shorting during supply of the source current.

DESCRIPTION OF THE PREFERRED EMBODIMENT

Figure 1:
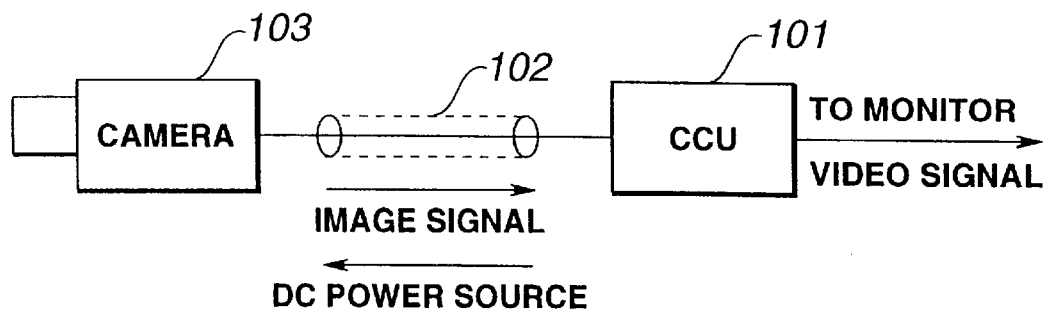
FIG. 1 illustrates a camera control unit an a camera device employing a conventional power source device.
Figure 2:
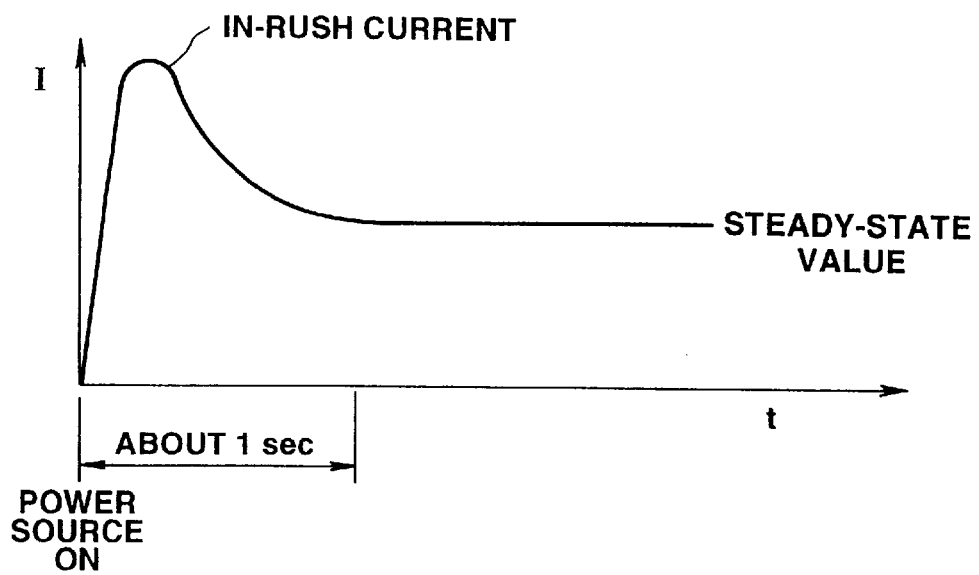
FIG. 2 is a graph showing the state of the current on power up of the camera device of FIG. 1.
Figure 3:
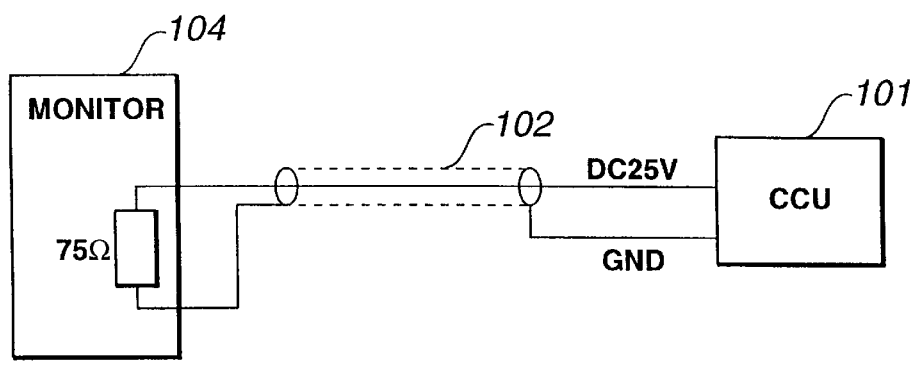
FIG. 3 illustrates the state in which a load resistor of the camera device is burned out.
Figure 4:
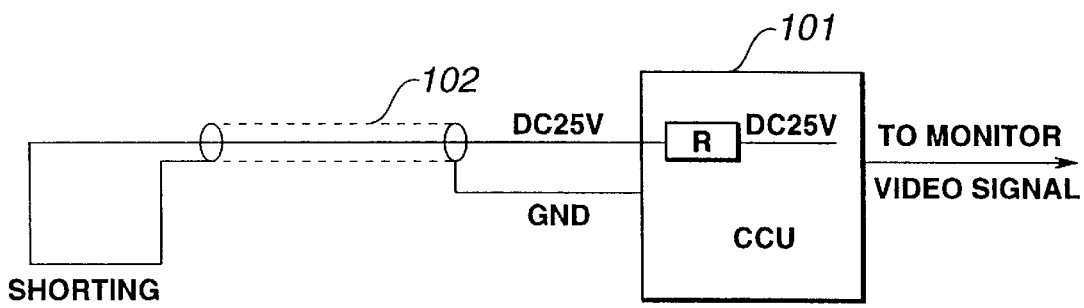
FIG. 4 illustrates the state of shorting of the camera device.

Referring to the drawings, a preferred embodiment of the present invention will be explained in detail.

Figure 5:
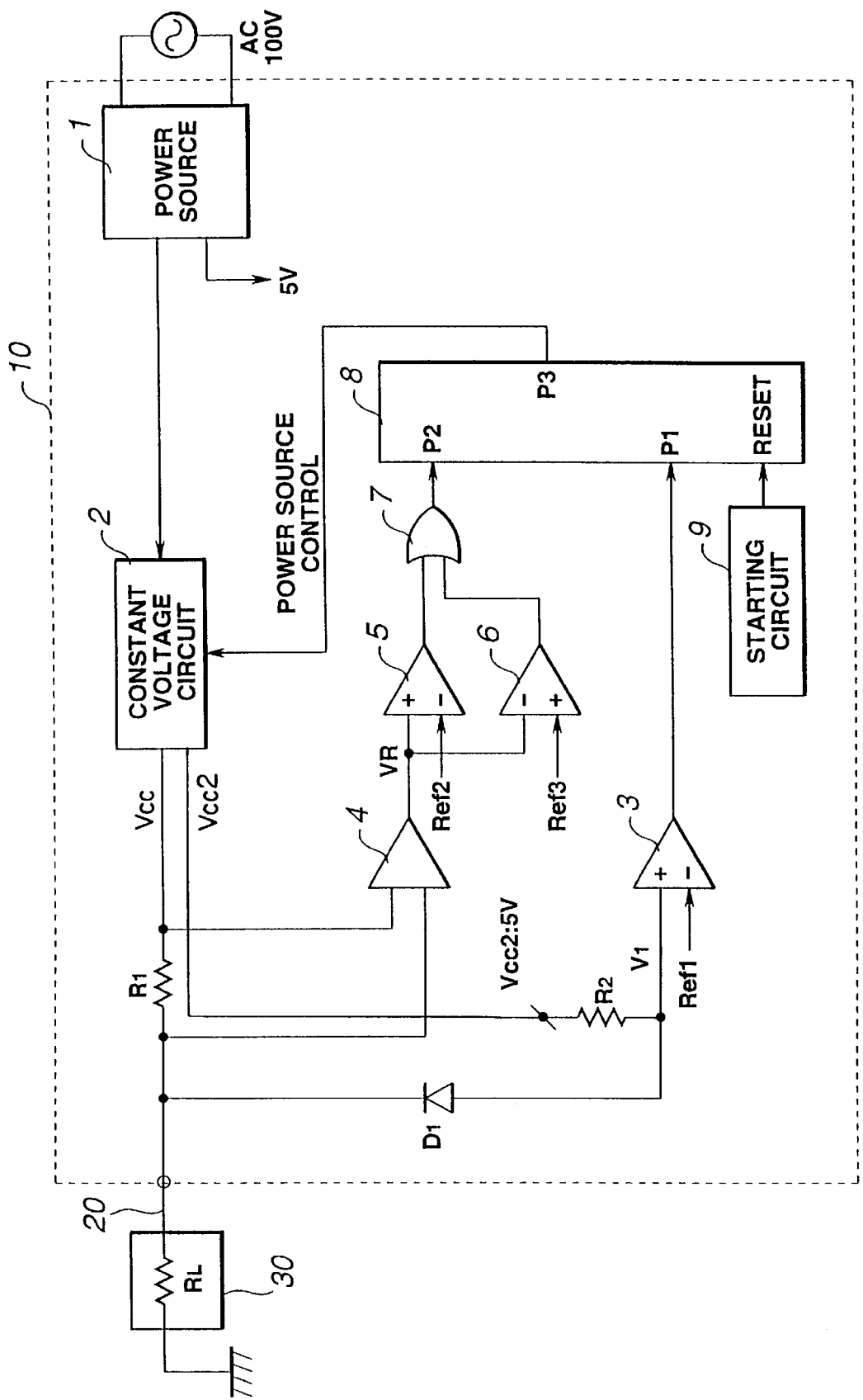
FIG. 5 is a block diagram showing an illustrative structure of a CCU embodying the present invention.
Figures 6, 7:
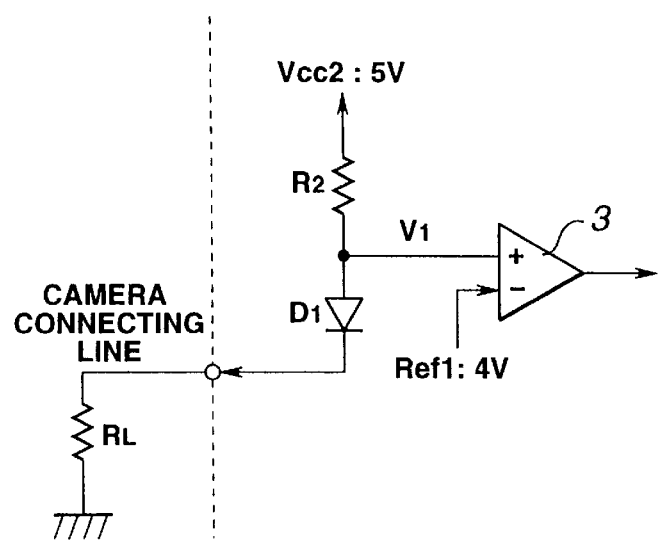
FIG. 6 is a circuit diagram showing a comparator for load resistance detection in the CCU of FIG. 5.
FIG. 7 illustrates output of an OR gate in the CCU.

A CCU 10 embodying the present invention is connected to a camera device 30 for supplying the current to the camera device 30 having an impedance (load resistance) RL, as shown in FIG. 5.

Specifically, the CCU 10 includes a power source circuit 1 for generating a dc power source from an ac source, and a constant voltage source 2 for supplying a pre-set power source to the camera device 30 via a serial resistor R1. The CCU 10 also includes a comparator 3 for detecting whether or not a voltage V1 of the junction between a resistor R2 and a diode D1 is higher than a reference value Ref1, and a differential amplifier circuit 4 for detecting a voltage VR impressed to both ends of the resistor R1. The CCU 10 also includes a comparator 5 for detecting whether or not the voltage to both ends of the resistor R1 is higher than the upper limit value Ref2 and a comparator 6 for detecting whether or not the voltage is lower than a lower limit value Ref3. The CCU 10 further includes an OR gate 7 for outputting the logical sum of the outputs of the comparators 5 and 6 and a micro-computer 8 for controlling the power on/off of the constant-voltage circuit 2 based on outputs of comparator 3 and the OR gate 7.

The power source circuit 1 furnishes the dc current, obtained on rectifying the ac current supplied from a commercial power source of ac 100V, to the constant voltage circuit 2 and the micro-computer 8.

The constant voltage circuit 2 is a serial regulator for converting the power source voltage from the power source circuit 1 to 25 V and outputting the 25 V voltage under control by the micro-computer 8. The output voltage Vcc of the constant voltage circuit 2 is supplied via serial resistor R1 to the camera device 30.

If the power from power source 1 is disabled by micro-controller 8, the constant voltage circuit 2 furnishes a voltage Vcc2 to the camera device 30 via series connected resistor R2 and diode D1. At this time, the comparator 3 compares the level of the voltage V1 of a junction between the resistor R2 and diode D1 to a pre-set reference voltage Ref1 in order to output level signals '1' and '0' if the voltage V1 is higher or lower in voltage level, respectively.

If the constant voltage circuit 2 outputs Vcc, the diode D1 is turned off, so that the comparator 3 is disconnected from the circuit so as not to affect the other circuitry during supply of the source voltage.

If the forward voltage drop of the diode D1 is Vth, V1 is given by:

$$V1=(Vcc2-Vth)\times RL/(RL+R2)+Vth \quad (1)$$

If the resistance R2, voltage drop Vth, voltage Vcc2 and the load resistance RL of the CCU 10 are 75 ohms, 0.6 V, 5 V and 255 ohms are substituted into equation (1), V1 becomes equal to 4 V. Therefore, if the reference voltage Ref1 is 4 V, the comparator 3 outputs level signals '1' and '0' when the load resistance RL is larger than 255 ohms and when the load resistance RL is smaller than 255 ohms, respectively.

When the constant voltage circuit 2 is furnishing the power of the power source to the camera device 30, the differential amplifier circuit 2 detects the level of the voltage VR impressed to both ends of the resistor R1 in order to supply the level of the voltage VR to the comparators 5 and 6.

The comparator 5 compares the level of the voltage VR to that of the voltage Ref2 set as an upper limit value for voltage VR and outputs '1' and '0' if the level of the voltage VR is higher or lower, respectively.

The comparator 5 compares the level of the voltage VR to that of the voltage Ref3 set as a lower limit value for voltage VR and outputs '0' and '1' if the level of the voltage VR is higher or lower, respectively.

The reference voltages Ref2 and Ref3 set maximum and minimum values of the normal current flowing in the camera device 30. If the maximum and minimum values of the normal current are Ia and Ib, respectively, reference voltage Ref2=R1×Ia reference voltage Ref3=R1×Ib.

The OR gate 7 finds the logical sum of the outputs of the comparators 5 and 6 and routes the result of the OR operation to a port P2 of the micro-computer 8.

Thus, if the level of the voltage VR is higher than the reference voltage Ref2, the comparators 5 and 6 output '1' and '0', respectively, with the OR gate 7 outputting '1'. If the level of the voltage VR is higher than the reference voltage Ref3 and lower than Ref2, both the comparators 5 and 6 output '0', with the OR gate 7 outputting '0'. If the level of the voltage VR is lower than the reference voltage Ref3, the comparators 5 and 6 output '0' and '1', respectively, with the OR gate 7 outputting '1'.

That is, if the level of the voltage VR impressed to both ends of the resistor R1 is intermediate between the reference voltages Ref2 and Ref 3, that is if the current flowing in the camera device 30 is the normal current, the OR gate 7 outputs '0'. If the current flowing in the camera device 30 is the abnormal current, the OR gate 7 outputs '1'.

If the power is supplied from the power source circuit 1 to the micro-computer 8 and a reset pulse is entered via a starter circuit 9 to its reset terminal, the micro-computer 8 is started to control a port P3 in order to control the constant voltage source 2 so that the voltage Vcc is not impressed to the resistor R1. At this time, the voltage Vcc2 is impressed to the camera device 30 via resistor R2 and diode D1. The comparator 3 then sends to the port P1 of the micro-computer 8 level signals '0' or '1' indicating whether or not the load resistance RL is higher than 255 ohms, respectively.

The micro-computer 8 is also designed for controlling the constant voltage circuit 2 for impressing a source voltage Vcc (25V) based on the level signal supplied to the port P1. Specifically, the micro-computer 8 stores the state of not impressing the output voltage Vcc of the constant voltage circuit 2 if the level signal supplied to the port 1 is '0', that is if the load resistance RL is higher than 255 ohms. Conversely, the micro-computer 8 stores the state of impressing the output voltage Vcc (25V) if the level signal supplied to the port 1 is '1', that is if the load resistance RL is higher than 255 ohms. Thus, if the power is supplied to the camera device 30, the OR gate 7 sends to the port P2 of the micro-computer 8 level signals '0' or '1' specifying whether or not the current flowing through resistor R1, that is the camera device 30, is normal.

If, after a lapse not shorter than a pre-set time after for impressing the pre-set voltage across the constant voltage circuit 2, the level signal '1' is supplied to the port P2, the micro-computer 8 controls the constant voltage circuit 2 for stopping the supply of the source current. Conversely, if the level signal '0' is supplied to the port P2, the micro-computer 8 controls the constant voltage circuit 2 for continuing the supply of the source power to the camera device 30.

With the above-described CCU 10, if the power source for the camera device is supplied by mistake to the electronic equipment, such as the monitor device, the load resistor of the electronic equipment is not burned out. In other words, if shorting has occurred during supply of the source voltage to the camera device 10, self-destruction of the load resistor by over-voltage can be prevented from occurring.

Figure 8:
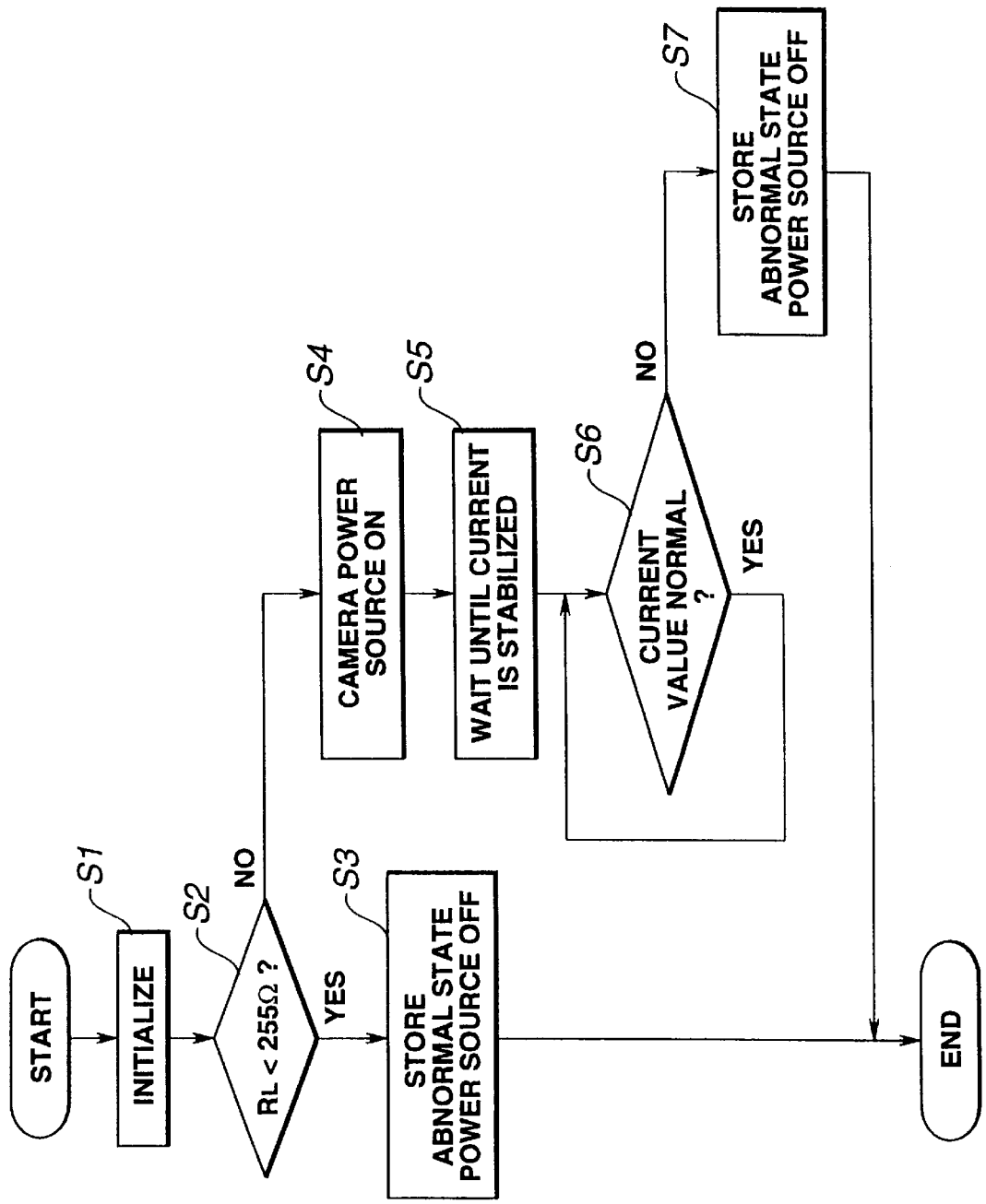
FIG. 8 is a flowchart for illustrating the operation of a micro-processor in the CCU.

Specifically, if the user connects the CCU 10 to the camera device 30 over a cable 20 for turning on a power source switch, not shown, a commercial ac 100 V is supplied to the power source circuit 1, so that the micro-computer 8 performs the processing of steps S1 and the following steps as shown in FIG. 8.

At step S1, the micro-computer 8 initializes the ports P1 to P3 when the source voltage is supplied from the power source circuit 1. After thus initializing the ports P1 to P3, the micro-computer 8 controls the constant voltage circuit 2 for not impressing the source voltage Vcc to the load resistance RL, at the same time [as it impresses] impressing a small voltage [Vcc] Vcc2 to the camera device 30 via resistor R2.

At step S2, the micro-computer 8 checks whether or not the load resistance RL is smaller than 255 ohms. If the micro-computer 8 detects that the load resistance RL is smaller than 255 ohms, it proceeds to step S3 and, if otherwise, it proceeds to step S4. Stated differently, if the level signal supplied to the port P1 is '0', with the load resistance RL being then lower than 255 ohms, the micro-computer 8 proceeds to step S3, whereas, if the level signal is '1', with the load resistance RL being then larger than 255 ohms, the micro-computer 8 proceeds to step S4.

At step S3, since the load resistance RL of the electronic equipments is too low to supply the source power to the camera device 30, the micro-computer 8 stores in memory the abnormal state of the low load resistance RL and controls the constant voltage circuit 2 to not impress the voltage Vcc across load RL. Since the micro-computer 8 can impress a smaller voltage of 5V before supplying the power source voltage to the camera device 30 for detecting the load resistance RL, it can be checked whether the load resistance RL is lower than 255 ohms without burning out the load resistance RL. On the other hand, since the power source is [not] turned [on] off if the micro-computer 8 detects that the load resistance RL is lower than 255 ohms, it becomes possible to avoid burning out [of the] load resistance RL [of the electronic equipments] mistakenly connected to the cable 20.

At step S4, to which the micro-computer 8 proceeds if it has detected at step S2 the load resistance to be not lower than 255 ohms, the micro-computer controls the constant voltage circuit 2 for supplying the source voltage to the camera device 30 before proceeding to step S5.

At step S5, the micro-computer 8 is at a stand-by state for about 1 second since the supply of the source current to the camera device 30 until disappearance of the inrush current. The micro-computer 8 then proceeds to step S6.

At step S6, the micro-computer 8 detects whether the value of the current flowing in the camera device 30 is normal, at such a timing in which the inrush current possibly has disappeared such that the current flowing in the camera device 30 is possibly normal. If the micro-computer 8 detects that the current value is normal, it dwells at step S6 and, only if otherwise, the micro-computer 8 proceeds to step S7. That is, at step S6, the micro-computer 8 perpetually monitors whether or not, during the time the source current is supplied to the camera device 30, the cable 20 becomes shorted to permit the abnormal current to flow, and also perpetually monitors whether or not the load is connected in circuit. The micro-computer 8 detects this based on an input to the port P2.

At step S7, the micro-computer 8 holds in memory the state of the abnormal current flowing in the camera device 30, and subsequently controls the constant voltage circuit 2 for stopping the supply of the source current to the camera device 30. Thus the micro-computer 8 controls the constant voltage circuit 2 for stopping the current supply to the camera device 30 on detection of the abnormal current during the time of supply of the source current to the camera device 30 for prohibiting damage to the load resistance of the CCU 10 due to overvoltage.

With the CCU 10 of the present invention, as described above, a lower voltage for load resistance detection is previously impressed to the camera device 30 to be supplied with the source current, for detecting the load resistance RL of the camera device 30, and the source current is supplied only when the load resistance is higher than 255 ohms, as an example. The CCU 10 also stops the supply of the current source if the current is not normal or has ceased to be normal. This prohibits damage to the camera device 30, other electronic equipment or to the CCU 10 itself.

The present invention is not limited to the above-described embodiment unless there is a contrary statement. For example, the present invention can naturally be applied to an electronic equipment having known values of the internal load resistance, such as a booster or a broadcasting satellite converter.

What is claimed is:

1. A power source device for supplying power to electronic equipment via a power source line, comprising:
   impedance detection means for detecting, by impressing a first voltage to said electronic equipment via the power source line, whether the impedance of the electronic equipment is higher than a pre-set value;
   source power supplying means for supplying a second source voltage higher than a first voltage to said electronic equipment via the power source line; and
   control means for controlling said source power supplying means, so that when the impedance detected by said impedance detection means is higher than said pre-set value, said source power supplying means supplies power to said electronic equipment via the power source line at said second source voltage, and does not supply power to the electronic equipment at said first voltage.

2. The power source device as claimed in claim 1 wherein said control means holds the state of disabling said source power supply means for as long as an impedance higher than said pre-set value is not detected by said impedance detecting means.

3. The power source device as claimed in claim 1 further comprising:
   current detection means for detecting the value of the current supplied via said power source line to said electronic equipment;
   said control means controlling the source power supply means for stopping the source power supply when, with the source current being supplied by said source power supply means to the electronic equipment, said current detection means detects the current in an amount other than the predetermined range.

4. The power source device as claimed in claim 1 wherein said control means starts control based on the results of detection by said current detection means after a lapse of a pre-set time from when said source power supply means starts supplying power to said electronic equipment.

5. The power source device as claimed in claim 1 wherein said control means starts control based on the results of detection by said current detection means after lapse of a pre-set time from when said source power supply means start supplying power to the electronic equipment.

6. The power source device as claimed in claim 1 wherein said electronic equipment is a camera device and the power source device is provided in a camera control unit assigned to control the camera device.

7. A power source device for supplying source power to electronic equipment via a power source line, comprising:

a first power source circuit having a first voltage, connected to the electronic equipment via a power source line;

a second power source circuit having a second voltage lower than said first voltage, also connected to the electronic equipment via said power source line;

switching means connected between said first and second power source circuit and said power source supply line;

impedance detection means connected to said power source line for detecting whether an impedance of said electronic equipment is higher than a pre-set value; and control means for controlling the source power supplying means for supplying said second source voltage to said electronic equipment via the power source line, when the impedance detected by said impedance detection means is higher than said pre-set value, said second power source circuit supplies the source power to the electronic equipment via said switching means, and said first power source circuit does not supply the source power to the electronic equipment.

8. The power source device as claimed in claim 7 further comprising:

current detection means for detecting the value of the current supplied via said power source line to said electronic equipment;

said control means controlling the source power supplying means for disabling the source power supply when said current detection means detects the current in an amount other than the predetermined range.

9. The power source device as claimed in claim 8 wherein said control means starts control based on the results of detection by said current detection means after a lapse of a pre-set time from when said source power supply means starts supplying said source power to said electronic equipment.

10. The power source device as claimed in claim 7 wherein, when the source power is being supplied to said electronic equipment, said switching means is turned off so that said impedance detection means is turned off.

11. The power source device as claimed in claim 7 wherein said electronic equipment is a camera device and the power source device is provided in a camera control unit designed to control the camera device.

12. A method for supplying source power to electronic equipment via a source power supply line, comprising:

supplying a first voltage to said electronic equipment via said source power supply line;

detecting, with said first voltage applied to said electronic equipment, whether the impedance is higher than a pre-set value; and supplying a second source voltage higher than said first voltage via said source power supply line when the impedance detected by said impedance detection means is higher than said pre-set value.

* * * * *